US010725694B1

(12) United States Patent
Smaldone et al.

(10) Patent No.: US 10,725,694 B1
(45) Date of Patent: Jul. 28, 2020

(54) MEETING BACKUP WINDOW REQUIREMENTS WHILE MANAGING STORAGE ARRAY BACKUP LOAD

(71) Applicant: EMC IP Holding Company LLC, Hopkinton, MA (US)

(72) Inventors: Stephen Smaldone, Woodstock, CT (US); Ian Wigmore, Westborough, MA (US); Arieh Don, Newton, MA (US)

(73) Assignee: EMC IP Holding Company, LLC, Hopkinton, MA (US)

( * ) Notice: Subject to any disclaimer, the term of this patent is extended or adjusted under 35 U.S.C. 154(b) by 99 days.

(21) Appl. No.: 15/876,143

(22) Filed: Jan. 20, 2018

(51) Int. Cl.
*G06F 12/00* (2006.01)
*G06F 3/06* (2006.01)
*G06F 13/12* (2006.01)

(52) U.S. Cl.
CPC .......... *G06F 3/0659* (2013.01); *G06F 3/0604* (2013.01); *G06F 3/065* (2013.01); *G06F 3/067* (2013.01); *G06F 3/0611* (2013.01); *G06F 3/0619* (2013.01); *G06F 13/122* (2013.01)

(58) Field of Classification Search
CPC combination set(s) only.
See application file for complete search history.

(56) References Cited

U.S. PATENT DOCUMENTS

2011/0276823 A1* 11/2011 Ueno .................. G06F 11/1458
714/4.11

* cited by examiner

*Primary Examiner* — Yong J Choe
(74) *Attorney, Agent, or Firm* — Barry N. Young

(57) ABSTRACT

In a data processing system having multiple production hosts, each with a backup agent, interfaced to a storage array and to a backup server, an array I/O priority engine on the storage array establishes and enforces I/O priorities for I/O backup and production communications with the array to ensure that backup does not consume a disproportionate CPU processing and array bandwidth load or disrupt more critical production processing.

14 Claims, 2 Drawing Sheets

MEETING BACKUP WINDOW REQUIREMENTS WHILE MANAGING STORAGE ARRAY BACKUP LOAD

BACKGROUND

In a typical large data storage system, a plurality of production/application processing hosts (servers) process data and store results on storage devices such as logical volumes in a storage array. A traditional methodology for backing up the data in the storage array is for backup agents running on the production/application hosts to communicate with the storage array and a backup server. When a backup in required, the backup server informs the backup agents to read data from the storage array and forward the data to the backup server. The backup server in turn writes the data as a stream of backup data to backup media, such as a tape library or a purpose built backup appliance (PBBA). This means that when a backup is in progress the backup agents on the production servers consume CPU processing power and bandwidth (BW) and can slow or disrupt regular data processing of the hosts.

The backup server/PBBA has no control over the backup agents and no knowledge of the current processing loads on the production hosts. Backup agents respond to the backup application on the backup server and initiate a backup when told to do so without regard to ongoing processing operations on the storage array. Thus, an agent may delay an ongoing processing operation or unnecessarily consume a large amount of processing resources and bandwidth over a short period of time rather than spreading out the backup over a longer period of time and using fewer resources and less bandwidth. For instance, an agent may create a high CPU/BW load reading data from the storage array or from a local copy on a host for backup, even though the amount of data to be backed up is small and the backup window is large, and where a lower level of backup performance or a delay in initiating backup to permit an ongoing processing operation to complete would be adequate and less burdensome. This is very inefficient, and critical processing operations may be disrupted unnecessarily.

It is desirable to provide systems and methods that address the foregoing and other problems with backup by enabling a backup application residing on a backup server to exercise centralized management over the performance of backup agents on production hosts, and by enabling the storage array to establish and enforce I/O priorities on I/O communications with the storage array, and it is to these ends that the invention is directed.

DESCRIPTION OF PREFERRED EMBODIMENTS

The invention is particularly well adapted for backing up large data storage arrays having multiple sets of storage devices allocated to a plurality of corresponding production host servers with each production host running a backup agent, and will be described in that environment. It will be appreciated, however, that this is illustrative of only one utility of the invention and that the invention may be used effectively to manage backup in other types of storage systems.

As will be described, the invention provides systems and methods that enable a backup software application running on a backup server to exercise centralized control over the performance and operations of a plurality of backup agents running on production hosts in backing up data on a storage array. The invention uses I/O (input/output) tagging to tag each I/O sent from the production hosts to the storage array with an identifier associated with the process that created the I/O, and the storage array may store a table of identifiers and associated processes to enable the storage array to distinguish between backup agent I/Os and production application I/Os. The storage array handles each received I/O according to its I/O tag. Each backup agent may also communicate on-going information to the storage array that includes information on the amount of data to be backed up and its backup window parameters, and the storage array may prioritize I/O to and from the storage array to ensure that production and backup requirements are met.

Figure 1:
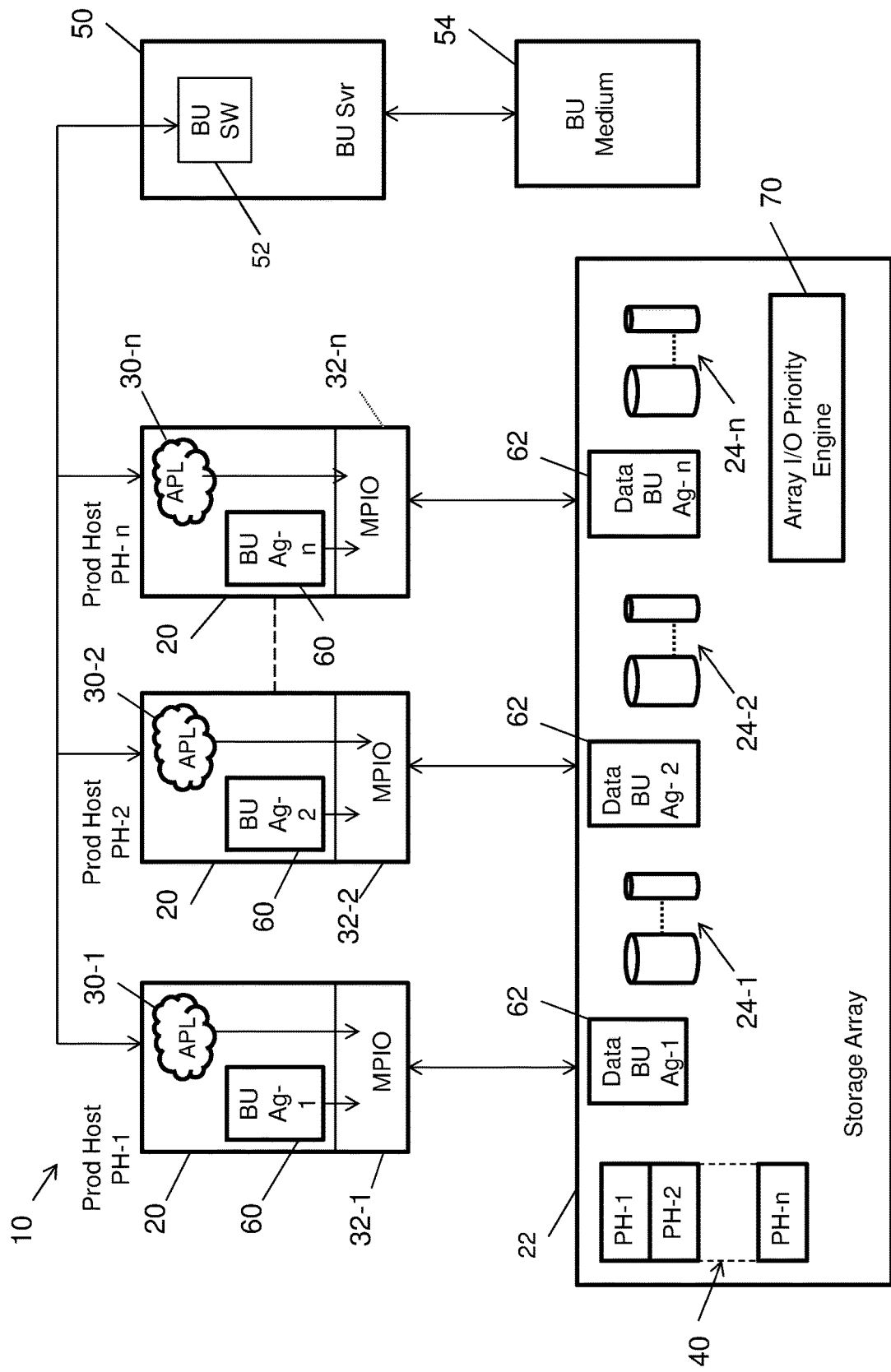
FIG. 1 is a functional diagrammatic view of a storage system in which the invention may be embodied.

FIG. 1 is a diagrammatic view of a storage system 10 in which the invention may be embodied. As shown, the storage system may comprise a plurality of production hosts (servers) 20 (PH-1, PH-2, . . . PH-n), that interface with a storage array 22 comprising a plurality of data storage devices 24-1, 24-2, . . . 24-n, such as logical volumes. The production hosts may be different types of processing machines, may be from different manufacturers, may have different operating systems, and may run the same or different sets of applications APL (30-1, 30-2, . . . 30-n). Storage devices in the storage array may be allocated in groups to the different production hosts for storing the associated production data of their hosts. In some embodiments, the storage array may comprise distributed storage with production data distributed among the storage devices of the array. Each production host may have MPIO software 32-1, 32-2, . . . 32-n that handles I/O between the production host and the storage array 22, and that tags each I/O with an identifier of the process that created the I/O. The storage array may store I/O tag identifiers and associated process names in a table, which may be updated as needed by users. As will be described below, the MPIO software applications may identify each production host to the storage array with information about the production host, such as its manufacturer, its IP address, license information, etc. The MPIO software applications may additionally tag each I/O with an identifier of the process that produced the I/O. The storage array handles I/Os from the production hosts per the information and the tags associated with the I/Os to insure that each I/O receives the appropriate performance handling priority, as will be described. The storage array may include a host registration table 40 which stores information in corresponding storage locations PH-1, PH-2, . . . PH-n about each production host of the storage system. The storage array may use the information in the host registration table to associate each I/O with a host and to manage the I/Os between the hosts and the storage array.

The storage system of FIG. 1 may also include a backup server 50 running backup software 52 for handling back up of production data from the storage array to backup media 54, such as tape or other backup storage media. As will be described, in accordance with the invention the backup server and software may exercise centralized control over the backup process through the use of backup parameters.

The production hosts may additionally include backup agents 60 (BU AG-1, BU AG-2 . . . BU AG-n) comprising executable instructions which control the production hosts to communicate with the backup software 52 on the backup server and the storage array to handle data backup to the backup server. The backup agents may read data for backup from storage devices of the storage array, or from a copy of the data from a copy of the production host on the storage array. The backup software may communicate to each backup agent appropriate information for that backup agent's production host to facilitate backup. The information may include for each production host/backup agent its backup window parameters such as backup window size and timing. Each backup agent may send to the storage array via a vendor unique SCSI command its backup window parameters as well as information as to its process name (to allow the array to distinguish between backup agent I/O and application I/O), the amount of data to back up, the proportion or percentage of data already backed up, and the time remaining in the backup window. The storage array may store the backup window parameters and information from each production host's backup agent in corresponding data storage areas 62 (BU AG-1 Data, BU AG-2 Data, . . . BU AG-n Data) in the storage array, and use the stored information for managing backup. As will be described, this backup information will preferably be updated regularly at predetermined time intervals, e.g., every 5 minutes, by the backup server for each production host, and the updated backup information sent by each host to the storage array with the sending host's information.

As will be described, the stored backup information will be used by an array I/O priority engine 70 on the storage array 22 to manage in real time the I/O priorities for backup data from the storage devices 24 on the storage array to the backup agent 60 relative to the I/O priorities of production data to avoid disruption of critical production tasks. The I/O priority engine may establish I/O priorities according to processes by using the I/O tags. When the storage array receives I/Os from the production hosts, the array I/O priority engine can identify which processes created the I/Os by using information stored on the storage array that associates I/O tags and process names that created the I/O, and can decide the order (priority) in which to handle I/Os. While an I/O from a production host is waiting for processing, no CPU or bandwidth resources are being consumed by that I/O. Thus, by managing the timing and order of I/O processing, the array I/O priority engine effectively manages CPU and bandwidth load. Prior to the invention, attempting to use production hosts for controlling backup I/Os, as had previously been done, was not an effective way of managing I/O priorities on the storage array because production hosts are unaware of real time operations and the overall processing and bandwidth load on the storage array. Instead, in the invention, the array I/O priority engine being on the storage array is in a good position to manage and control I/O processing and backup priorities since it is aware of whether an I/O is from a backup agent or not.

The array I/O priority engine may comprise a processor having non-transitory storage media storing executable instructions for controlling the processor to perform the functions and operations described herein. It is formed to monitor and be aware of all processing operations and all I/O and bandwidth load on the storage array at any given time, and determine and allocate I/O priorities for backups as needed to handle first the more important I/O associated with production tasks while still accomplishing backup, as described in more detail below.

In many instances backup tasks have a lower priority than production processing tasks, and frequently may be accomplished either as partial backups in discontinuous time blocks or postponed until a later time. Also, different production tasks frequently have different priorities. System administrators or other users may establish policies and priorities among competing tasks to handle conflicts and to ensure that tasks having higher priorities are appropriately completed before tasks with lower priorities. For example, in accordance with the invention a weighting function such as follows may be used to calculate and assign I/O priorities:

$$Ax+By+Cz+\ldots$$

where A, B and C are coefficient weights that reflect the priorities assigned by the user. The weights may be selected according to the relative importance of different tasks, and they inform the BU server of the weighting function to be used to determine priorities for that user.

Where there is global conflict among users, such as where one or more backup agents will be unable to complete their backups within the given backup time window because of production or other tasks, the administrator may specify at the backup server per-host policies as to the order in which service level agreements (SLAs) of different users should be violated. The backup server may then pass this information to the storage array via the backup agents and the MPIO software so that the storage array I/O priority engine may choose which I/Os to prioritize in the event it cannot satisfy all SLAs.

Figure 2:
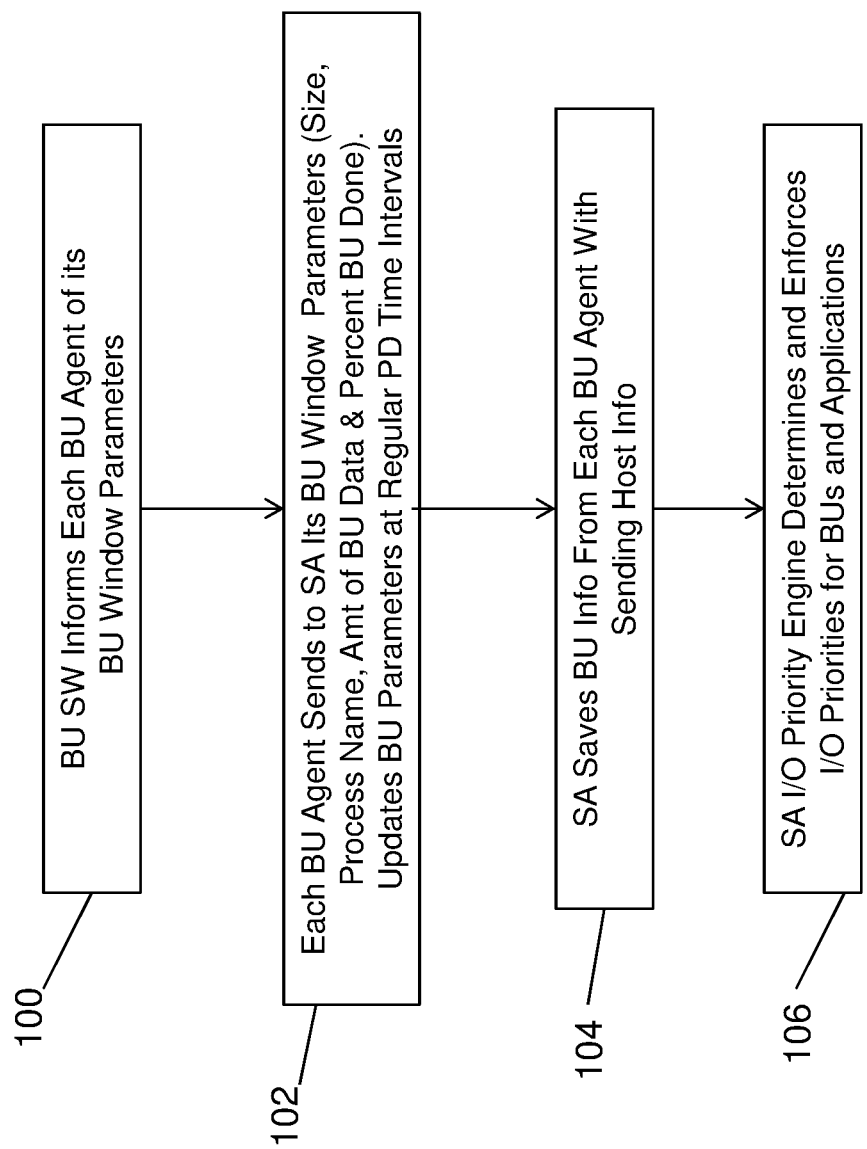
FIG. 2 is a diagrammatic view of a process for managing backup in accordance with the invention.

FIG. 2 gives an overview of a process in accordance with the invention for prioritizing and controlling I/O in the storage array to ensure that backup can be completed within the assigned backup windows while minimizing the impact on CPU and bandwidth resources of the production host connected to the array.

Referring to FIG. 2, at 100 the backup software on the backup server informs each backup agent of its backup window parameters, e.g., size, timing, amount of data to be backed up, etc. At 102, each backup agent will send to the array its backup window size, its production process I/O tag, the amount of data to be backed up, and the proportion (percentage) of backup already done. Periodically, at predetermined intervals of time, such as every 5 minutes, each backup agent will resend updated backup information to the storage array. At 104, the storage array will save the information received from each backup agent in the corresponding data storage area for that backup agent/production host in the storage array, along with the sending host's information. Thus, at any given time the stored backup information will be substantially current, and the storage array will be aware of the backup requirements for each backup agent/production host of the system, as well as the current production processing load and bandwidth load on the storage array. The storage array I/O priority engine may prioritize the handling of I/Os, as appropriate, to ensure that a backup agent is not consuming a disproportionate amount of processing and bandwidth resources above what is needed for a specific backup cycle.

Knowing this information, and the remaining time in the backup window, at 106 the array I/O priority engine, can determine and set the I/O priorities for the backup agents relative to the production applications I/Os of the production hosts connected to the array, as by using an I/O priority weighting function such as described above, and manage backup I/O priorities so that all backups can be efficiently completed during the backup window. The storage array may then enforce the calculated I/O priorities against the incoming I/O by using the MPIO I/O tags to identify the sources and processes that created the I/Os.

The invention will set backup agent's I/O priorities while considering all of the backup agents' I/O priority requirements from the storage array, thus ensuring the backup agents consume only the amount of CPU processing and bandwidth required to meet the backup window and SLA requirements. Previously, without centralized control as afforded by the invention, each backup agent was at best aware of only the CPU and bandwidth needs of the applications on the host that the backup agent was running on, but was unaware that its backup may be consuming array resources needed by other backup agents and production applications.

While the foregoing description has been with respect to certain preferred embodiments of the invention, it will be appreciated that changes may be made to these embodiments without departing from the spirit and principles of the invention which is defined by the appended claims.

The invention claimed is:

1. A method of managing data backup in a data storage system having a plurality of production hosts interfaced to a backup server and to a storage array having a plurality of data storage devices that store production data from said production hosts, comprising:
   storing on the storage array backup window parameters for each of the plurality of production hosts, said backup window parameters comprising backup window sizes and the amount of data to be backed up;
   monitoring by said storage array input/output (I/O) communications between said production hosts and the storage array to identify the production host and process that produced each I/O communication;
   establishing by the storage array, based upon said backup window parameters and said monitored I/O communications, priorities for backup and production I/O communications; and
   controlling by the storage array said backup and production communications according to the established I/O priorities so that high priority production processing operations are not disrupted by lower priority backup operations.

2. The method of claim 1, wherein said backup window parameters further include the time remaining in the backup window and the amount of data remaining to be backed up, and the method further comprises updating at regular time intervals said backup window parameters stored on the storage array such that the storage array has substantially current information for controlling backup.

3. The method of claim 1 further comprising scheduling by the storage array partial backup operations to be performed during times of low production processing and low bandwidth loads.

4. The method of claim 1, wherein said monitoring I/O communications comprises reading at said storage array process tags on said I/O communications that indicate the production host and process that produced the I/O communication.

5. The method of claim 4 further comprising handling by said storage array said I/O communications in accordance with information on said tags.

6. The method of claim 1, wherein said establishing comprises establishing I/O priorities for production and backup processes on a per-host basis using a weighting function having weights defined by a user.

7. The method of claim 1, wherein said controlling comprises controlling by the storage array backup operations performed on the storage array and the bandwidth of I/O communications between the storage array and production hosts.

8. In a data storage system having a plurality of production hosts interfaced to a backup server and to a storage array having a plurality of data storage devices that store production data from said production hosts, a computer product comprising a non-transitory storage medium embodying executable instructions for controlling processors to perform a method of:
   storing on the storage array backup window parameters for each of the plurality of production hosts, said backup window parameters comprising backup window sizes and the amount of data to be backed up;
   monitoring by said storage array input/output (I/O) communications between said production hosts and the storage array to identify the production host and process that produced each I/O communication;
   establishing by the storage array, based upon said backup window parameters and said monitored I/O communications, [I/O] priorities for backup and production I/O communications; and
   controlling by the storage array said backup and production communications according to the established I/O priorities so that high priority production processing operations are not disrupted by lower priority backup operations.

9. The computer product of claim 8, wherein said backup window parameters further include the time remaining in the backup window and the amount of data remaining to be backed up, and the method further comprises updating at regular time intervals said backup window parameters stored on the storage array such that the storage array has substantially current information for controlling backup.

10. The computer product of claim 8 further comprising scheduling partial backup operations to be performed during times of low production processing and low bandwidth loads.

11. The computer product of claim 8, wherein said monitoring I/O communications comprises reading at said storage array tags on said I/O communications that indicate the production host and process that produced the I/O communication.

12. The computer product of claim 11 further comprising handling by said storage array said I/O communications in accordance with information on said tags.

13. The computer product of claim 8, wherein said establishing comprises establishing I/O priorities for production and backup processes on a per-host basis using a weighting function having weights defined by a user.

14. The computer product of claim 8, wherein said controlling comprises controlling by the storage array backup operations performed on the storage array and the bandwidth of I/O communications between the storage array and production hosts.

* * * * *